United States Patent [19]

Hoeschele

[11] Patent Number: 4,973,658
[45] Date of Patent: Nov. 27, 1990

[54] THERMOPLASTIC COPOLYESTER ELASATOMER BINDER FOR OXIDIZER PARTICLES

[75] Inventor: Guenther K. Hoeschele, Wilmington, Del.

[73] Assignee: E. I. Du Pont de Nemours and Company, Wilmington, Del.

[21] Appl. No.: 245,150

[22] Filed: Sep. 16, 1988

Related U.S. Application Data

[63] Continuation-in-part of Ser. No. 140,252, Dec. 31, 1987, abandoned.

[51] Int. Cl.⁵ .......................................... C08G 63/183
[52] U.S. Cl. .............................. 528/308.7; 528/308.6; 528/289
[58] Field of Search ..................... 528/308.7, 289, 308, 528/308.6

[56] References Cited

U.S. PATENT DOCUMENTS

| | | | |
|---|---|---|---|
| 3,651,014 | 3/1972 | Witsiepe | 260/75 R |
| 4,013,624 | 3/1977 | Hoeschele | |
| 4,094,721 | 6/1978 | Sturm et al. | 528/308.7 |
| 4,197,353 | 4/1980 | Tobias et al. | 528/308.7 |
| 4,371,692 | 2/1983 | Wolfe, Jr. | 528/289 |
| 4,650,617 | 3/1987 | Kristofferson et al. | 264/3.3 |
| 4,714,754 | 12/1987 | McCready et al. | 528/289 |
| 4,732,947 | 3/1988 | McCready et al. | 528/289 |
| 4,795,790 | 1/1989 | McCready et al. | 528/289 |
| 4,914,178 | 4/1990 | Kim et al. | 528/308.7 |

FOREIGN PATENT DOCUMENTS 2106916 4/1983 United Kingdom .

OTHER PUBLICATIONS

J. R. Wolfe, Jr., A.C.S. Adv. Chem. Ser. 176, 129 (1979).
A. Ghaffer et al., Br. Polym. J., 5, 315 (1973).
A. Ghaffer et al., Br. Polym. J., 10, 115 (1978).

*Primary Examiner*—John Kight, III
*Assistant Examiner*—Dennis R. Daley

[57] ABSTRACT

A polymer which is useful as a thermoplastic rubbery binder for oxidizer particles, such as HMX and RDX, for the preparation of low vulnerability gun propellants is provided by a segmented thermoplastic copolyester elastomer consisting essentially of a multiplicity of recurring intralinear long chain and short chain ester units connected head-to-tail through ester linkages, said long chain ester units being represented by a structure selected from the following group consisting of:

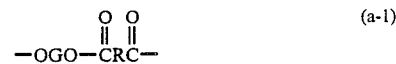

and

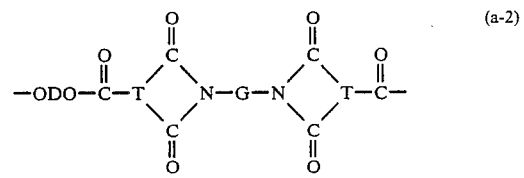

and said short chain ester units being represented by the following structure:

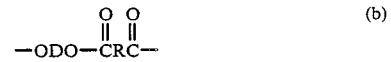

wherein:
G is a divalent radical remaining after removal of terminal hydroxyl groups from a poly(alkylene oxide) glycol having a carbon-to-oxygen ratio of about 2.0–4.3 and a molecular weight of about 600–6000;
R is a divalent radical remaining after removal of carboxyl groups from a dicarboxylic acid having a molecular weight less than about 300;
D is a divalent radical remaining after removal of hydroxyl groups from a linear diol having 2–8 carbon atoms and represented by the formula $HO(CH_2)_{2-8}OH$ or the diol $HO(CH_2CH=CHCH_2)OH$; and
T is a trivalent radical remaining after the removal of carboxyl groups from a tricarboxylic acid having a molecular weight less than about 350 and containing two vicinal carboxyl groups capable of forming a cyclic imide;
with the proviso that the short chain ester units consitute about 30–65% by weight of the copolyester, at least about 50% of the R groups are 1,4-phenylene radicals, at least about 50% of the D groups are 1,6-hexamethylene radicals, and the sum of the percentages of the R groups which are not 1,4-phenylene radicals and of the D groups which are not 1,6-hexamethylene radicals is about 5–50%.

For use as a propellant binder it is preferred that the copolyester have a melt index at 120° C. by ASTM-D1238 of about 2–25 grams/10 minutes.

8 Claims, No Drawings

THERMOPLASTIC COPOLYESTER ELASATOMER BINDER FOR OXIDIZER PARTICLES

BACKGROUND OF THE INVENTION

This is a continuation-in-part of application Ser. No. 07/140,252, filed Dec. 31, 1987 now abandoned.

Gun propellant compositions which exhibit low vulnerability to heat, flame, impact, friction, etc. can be made by binding small particles of oxidizers such as HMX (cyclotetramethylene tetranitramine) and RDX (cyclotrimethylene trinitramine) with rubbery thermoset polymers such as polyurethane elastomers as described in U.S. Pat. No. 4,650,617. Thermoset polyurethane binders are advantageous in that the initial mixture of polyol and polyisocyanate is a liquid exhibiting a relatively low viscosity which facilitates mixing of the oxidizer and the binder with low shear at acceptable mixing temperatures. The resulting blend is then extruded to form propellant grains after which cure of the thermoset binder is completed in a further step. A disadvantage associated with the polyurethanes which is typical for thermoset binders is that curing; i.e., reaction of polyisocyanate and polyol, begins as soon as the two ingredients are brought together and continues throughout the steps of blending with the oxidizer and extrusion to form grains. As a consequence, the viscosities of the binder and the resulting blend with the oxidizer increases as processing continues. In batch operations, this means that the blend being extruded into grains will be more viscous toward the end of a run than the material initially extruded. The larger the batch size, the more pronounced this effect becomes. By operating continuously, the problem of increasing viscosity can be avoided, but is replaced by metering problems of the two liquids for the binder and of the solid oxidizer, all three of which must be supplied in constant proportions to guarantee the performance of the propellant. In either batch or continuous operation any interruption of the process due to mechanical failure or power failure for instance leaves one with substantial amounts of a viscous blend which will cure in place to an intractable solid mass of propellant which can be removed only with difficulty and possible hazard.

A rubbery thermoplastic binder which had a suitable melting point and low enough viscosity to permit blending with the oxidizer and at the same time possessed adequate physical properties at temperatures to which the propellant grains might be exposed in storage would eliminate substantially all the problems associated with thermoset binders. Commercial grades of most available thermoplastic elastomers are generally far too viscous and high melting to even be considered as propellant binders. This is not surprising since it is normally desirable to have polymers which are useful at elevated temperatures. It is also known that in general, the higher the melt viscosity of a polymer, the better will be its physical properties.

Copolyetherester elastomers derived from terephthalic acid, 1,4-butanediol and poly(alkylene oxide) glycols are well known commercial rubbery thermoplastics which exhibit relatively low melt viscosities at low shear ratios compared to other thermoplastic elastomers. These commercial materials are much too high melting for use as propellant binders and as manufactured, are too viscous for blending with oxidizer particles. It is also characteristic of those commercial polymers that their physical properties are seriously diminished when the polymer is prepared so that its molecular weight and melt viscosity are lower; see U.S. Pat. No. 3,651,014 to Witsiepe, column 10.

In the course of research conducted to study the effect of structural variations on the properties of copolyetheresters, a number of copolyetheresters having melting points substantially below the melting points of commercial copolyetheresters have been prepared; J. R. Wolfe, Jr., ACS Avd. Chem. Ser. 176, 129 (1979); /Ghaffar and Goodman, Br. Polym. J. 5, 315 (1973). Generally these research polymers had high molecular weights and were therefore too viscous in the melt to be useful as propellant binders.

A related class of segmented copolyesters described in U.S. Pat. No. 4,556,705 to McCready differ from the copolyetheresters only in that the poly(alkylene oxide) glycol used in the copolyetheresters is replaced by a long-chain diimide diacid prepared by reacting trimellitic anhydride with a poly(alkylene oxide) diamine. None of the polymers described in U.S. Pat. No. 4,556,705 are suitable for use as propellant binders.

Therefore, a need exists to find a thermoplastic elastomer, such as a copolyester, which has both a low melting point and low melt viscosity while it still retains useful physical properties.

SUMMARY OF THE INVENTION

A polymer which is useful as a thermoplastic rubbery binder for oxidizer particles, such as HMX and RDX, for the preparation of low vulnerability gun propellants is provided by a segmented thermoplastic copolyester elastomer consisting essentially of a multiplicity of recurring intralinear long chain and short chain ester units connected head-to-tail through ester linkages, said long chain ester units being represented by a structure selected from the following group consisting of:

(a-1)

and

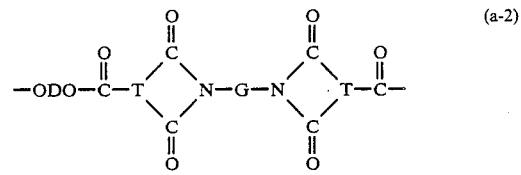

(a-2)

and said short chain ester units being represented by the following structure:

(b)

wherein:

G is a divalent radical remaining after removal of terminal hydroxyl groups from a poly(alkylene oxide) glycol having a carbon-to-oxygen ratio of about 2.0–4.3 and a molecular weight of about 600–6000;

R is a divalent radical remaining after removal of carboxyl groups from a dicarboxylic acid having a molecular weight less than about 300;

D is a divalent radical remaining after removal of hydroxyl groups from a linear diol having 2–8 carbon atoms and represented by the formula HO(CH$_2$)$_{2-8}$OH or the diol HO(CH$_2$CH=CHCH$_2$)OH; and T is a trivalent radical remaining after the removal of carboxyl groups from a tricarboxylic acid having a molecular weight less than about 350 and containing two vicinal carboxyl groups capable of forming a cyclic imide;

with the proviso that the short chain ester units constitute about 30-65% by weight of the copolyester, at least about 50% of the R groups are 1,4-phenylene radicals, at least about 50% of the D groups are 1,6-hexamethylene radicals, and the sum of the percentages of the R groups which are not 1,4-phenylene radicals and of the D groups which are not 1,6-hexamethylene radicals is about 5-50%

For use as a propellant binder it is preferred that the copolyester have a melt index at 120° C. by ASTM-D1238 of about 2-25 grams/10 minutes and more preferably a melt index of 4-15 grams/10 minutes. Copolyesters having melt indices within these ranges provide an optimum balance between the low viscosity which is desirable for mixing with the propellant and good physical properties such as tensile strength and elongation at break.

DETAILED DESCRIPTION OF THE INVENTION

The polymer of the present invention is prepared by melt condensation of terephthalic acid or its ester-forming equivalents (optionally containing up to 50 mole % of at least one other dicarboxylic acid), 1,6-hexanediol or its ester-forming equivalents, (optionally containing up to 50 mole % of at least one other low molecular weight diol) and either a poly(alkylene oxide) glycol having a number average molecular weight of 600-6000 and a carbon-to-oxygen ratio of about 2.0-4.3 or a diimide-diacid represented by the following structure:

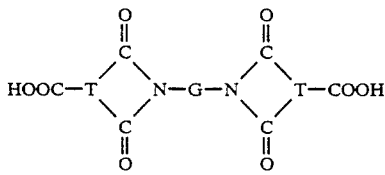

wherein T and G represent the radicals described hereinbefore.

Representative poly(alkylene oxide) glycols which provide the diradical —G— in long chain ester units represented by structures (a-1) and (a-2) include poly(ethylene oxide) glycol, poly(propylene oxide) glycol, poly(tetramethylene oxide) glycol, ethylene oxide-capped poly(propylene oxide) glycol, propylene oxide-capped poly(ethylene oxide)glycol and random copolyether glycols of ethylene oxide with propylene oxide and tetrahydrofuran with ethylene oxide or 3-methyl-tetrahydrofuran. Poly(ethylene oxide) glycol and poly(tetramethylene oxide) glycol are preferred. The poly(alkylene oxide)glycols cannot be used directly to prepare long chain ester units of structure (a-2) but must first be converted to their diamine analogues. Such diamines are available from Texaco Chemical Co. under the trademark "Jeffamine". The glycols can be converted to the corresponding diamines by the procedures listed in U.S. Pat. No. 4,556,688, column 4, lines 27-49.

The low molecular weight diols (other than 1,6-hexanediol) which may be used to provide —D— diradicals are linear diols having 2-8 carbon atoms represented by the formula HO(CHhd)$_{2-8}$OH or HO(CH$_2$CH=CHCH$_2$)OH. Preferred diols are ethylene, trimethylene, tetramethylene, pentamethylene, decamethylene glycol and 1,4-butenediol. Equivalent ester-forming derivatives of diols are also useful (e.g. ethylene oxide or ethylene carbonate can be used in place of ethylene glycol). The term "low molecular weight diols" as used herein should be construed to include such equivalent ester-forming derivatives.

Dicarboxylic acids (other than terephthalic acid) which may be used to provide —R— diradicals are aliphatic, cycloaliphatic or aromatic dicarboxylic acids of a low molecular weight, i.e., having a molecular weight of less than about 300. The term "dicarboxylic acids" as used herein, includes acid equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 is included provided the acid has a molecular weight below about 300. The dicarboxylic acids can contain any substituent groups which do not substantially interfere with the copolyester polymer formation and use of the polymer in the elastomer compositions of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid can be used.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals such as —O— or —SO$_2$—.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethylmalonic acid, allyl-malonic acid, 4-cyclohexane-1,2-dicarboxylic acid, 2-ethyl suberic acid, 2,2,3,3-tetramethylsuccinic acid, cyclopentanedicarboxylic acid, decahydro-1,5-naphthylene dicarboxylic acid, 4,4'-bicyclohexyl dicarboxylic acid, decahydro-2,6-naphthylene dicarboxylic acid, 4,4'-methylene-bis(cyclohexyl) carboxylic acid, 3,4-furan dicarboxylic acid, and 1,1-cyclobutane dicarboxylic acid. Preferred aliphatic acids are cyclohexane-dicarboxylic acids and adipic acid.

Representative aromatic dicarboxylic acids which can be used include phthalic and isophthalic acids, bibenzoic acid, substituted dicarboxy compounds with two benzene nuclei such as bis(p-carboxyphenyl) methane, p-oxy(p-carboxyphenyl) benzoic acid, ethylenebis(p-oxybenzoic acid) 1,5-naphthalene dicarboxylic acid, 2,6-naphthalene dicarboxylic acid, 2,7-naphthalene dicarboxylic acid, phenanthralene dicarboxylic acid, anthralene dicarboxylic acid, 4,4'-sulfonyl dibenzoic acid and $C_1$–$C_{12}$ alkyl and ring substitution derivatives thereof such as halo, alkoxy, and aryl derivatives. Hydroxyl acids such as p-($\beta$-hydroxy-ethoxy) benzoic acid can also be used providing an aromatic dicarboxylic acid is also present.

Aromatic dicarboxylic acids are a preferred class for preparing the copolyester polymers useful for compositions of this invention. Among the aromatic acids, those with 8–16 carbon atoms are preferred, particularly the phenylene dicarboxylic acids, i.e., phthalic and isophthalic acids.

Aromatic tricarboxylic acids (or their corresponding anhydrides and other ester-forming equivalents) which may be used to provide —T— radicals in long chain ester units of structure (a-2) may be aliphatic, cycloaliphatic or aromatic. As previously indicated, two of the three carboxyl groups attached to the —T— radical must be vicinal to permit the formation of a cyclic imide or cyclic anhydride.

While trimellitic anhydride is preferred as the tricarboxylic component, any of a number of suitable tricarboxylic acid constituents will occur to those skilled in the art including 2,6,7-naphthalene tricarboxylic anhydride; 3,3,,4-diphenyl tricarboxylic anhydride; 3,3,,4-benzophenone tricarboxylic anhydride; 1,3,4-cyclopentane tricarboxylic anhydride; 2,2',3-diphenyl tricarboxylic anhydride; diphenyl sulfone - 3,3'4-tricarboxylic anhydride, ethylene tricarboxylic anhydride; 1,2,5-napthalene tricarboxylic anhydride; 1,2,4-butane tricarboxylic anhydride; diphenyl isopropylidene-3,3',4-tricarboxylic anhydride; 3,4-dicarboxyphenyl-3-carboxyphenyl ether anhydride; 1,3,4-cyclohexane tricarboxylic anhydride, etc.

The molecular weight limitation of less than about 350 for the tricarboxylic acids providing radical —T— applies to the tricarboxylic acid and not to its anhydride or other ester-forming equivalents such as triesters.

Terephthalic acid (and a second dicarboxylic acid if present) is preferably introduced into the polymer in the form of a di-lower alkyl ester of which dimethyl terephthalate is especially preferred. 1,6-Hexanediol (and a second low molecular weight diol if present) is preferably used as such, but derivatives such as the diacetate can be used. The poly(alkylene oxide) glycols used to prepare long chain ester units (a-1) are normally introduced into the polymers as such, but derivatives including the diacetate can be used. The dimide diacids required to prepare long chain ester units (a-2) and represented by the following structure:

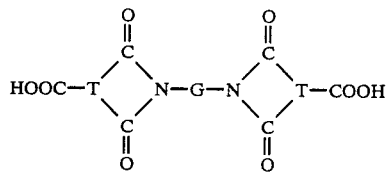

are usually introduced into the polymer as such although ester-forming derivatives such as di-lower alkyl esters can also be used. The diimide diacids may be preformed in a separate step prior to polymer formation or they may be formed in situ in the polymerization vessel from the tricarboxylic acid anhydride and poly(alkylene oxide) diamine, preferably before the addition of the dicarboxylic acid(s) or its lower-alkyl diester.

A preferred procedure consists of heating a mixture of dimethyl terephthalate containing 5–50 mole % dimethyl isophthalate, a molar excess of 1,6-hexanediol and either a poly(alkylene oxide) glycol or a diimide diacid in the presence of an esterification catalyst at 150 to 260° C. while distilling off methanol formed by ester interchange. Alternatively, a mixture of 1,6-hexanediol and a second diol, 1,4-butanediol being preferred, may be used with dimethyl terephthalate in place of a mixture of dimethyl terephthalate and isophthalate. This procedure results in the preparation of a low molecular weight prepolymer which is increased in molecular weight by polycondensation involving distillation of excess 1,6-hexanediol (alone or in admixture with a second diol) at pressures of less than 133 Pa at temperatures of 240–260° C. The polycondensation should be allowed to proceed only to the point at which the polymer has a suitable melt index. As previously indicated melt indices of 2–25 g/10 min. at 120° C are preferred and values of 4–15 g/10 min. at 120° C are especially preferred. By measuring the power required to agitate the polymer during the polycondensation it is possible to stop the reaction when a polymer having the desired melt index has been obtained once a correlation has been established between melt index and power requirements for the reaction vessel being used. Either batch or continuous methods can be used for any stage of copolyester polymer preparation.

A variety of esterification catalysts can be used to prepare the polymer, but organic titanates such as tetrabutyl titanate are preferred. In general, it is desirable to add a small amount of an antioxidant along with the monomers required to prepare the polymer. Representative antioxidants include secondary aromatic amines such as 4,4'-bis-($\alpha,\alpha$-dimethylbenzyl) diphenylamine and phenols such as 1,3,5-trimethyl-2,4,6-tri[3,5-di-tert.-butyl-4-hydroxy benzyl]benzene and N,N,-hexamethylenebis(3,5-di-tert-butyl-4-hydroxy-hydrocinnamide). Optionally a minor amount of a branching agent such as trimellitic anhydride may be used in conjunction with the other monomers to enhance the polymerization kinetics; see U.S. Pat. No. 4,013,624 to Hoeschele.

The dicarboxylic acids or their derivatives and either the polymeric glycol or the diimide diacid are incorporated into the final product in the same molar proportions as are present in the reaction mixture. The amount of low molecular weight diol actually incorporated corresponds to either the difference between the moles of diacid and polymeric glycol or to the sum of the moles of diacid and diimide diacid present in the reaction mixture. When mixtures of low molecular weight diols are employed, the amounts of each diol incorporated is largely a function of the amounts of the diols present, their boiling points, and relative reactivities. The total amount of diol incorporated is still either the difference between moles of diacid and polymeric glycol or the sum of the moles of diacid and diimide diacid.

As previously indicated the polymer should contain 30 to 65% by weight of short chain ester units. Polymers containing less than 30% by weight short chain ester units exhibit inferior physical properties while polymers containing greater than 65% by weight short chain ester units have poorer low temperature properties because of their higher glass transition temperatures. Polymers containing 40 to 55% by weight of short chain ester units are generally preferred.

Polymers based solely on 1,6-hexamethylene terephthalate short chain ester units, such as are disclosed in the literature are too high melting to be used as propellant binders. The melting points of the polymers of this invention are a function of the mole fraction of 1,6-hexamethylene terephthalate units contained in the polymer based on the total moles of short and long chain ester units present. The higher the mole fraction, the higher the melting point. The melting point of the instant polymers is lowered by introducing a second dicarboxylic acid and/or a second low molecular weight diol. It can also be lowered by reducing the weight proportion of short chain ester units or by using either a poly(alkylene oxide) glycol or a diimide diacid having a low molecular weight. When preparing polymers containing about 30 weight % short chain ester units, it may be desirable to use the maximum amounts permitted by the scope of this invention of terephthalic acid and 1,6-hexanediol to form the short chain ester units and to use a poly(alkylene oxide) glycol [HO-G-OH] in the upper part of the 600-6000 molecular weight range. Conversely, when preparing polymers containing about 65% by weight short chain ester units, it may be desirable to employ the second dicarboxylic acid and/or low molecular weight diol in larger amounts in combination with a poly(alkylene oxide) glycol [HO-G-OH] having a molecular weight in the lower part of the 600-6000 range.

The properties of this polymer can be modified by the incorporation of fillers and plasticizers. Generally only minor amounts of filler would be added when the polymer is used as a binder because of the increase in melt viscosity caused by the filler. Certain plasticizers may be added in limited amounts and may be advantageous on occasion because their presence lowers the melt viscosity of the polymer. Nitrate esters, such as nitroglycerine, are useful plasticizers which increase the energy available from a propellant. Furthermore, a nucleating agent such as the sodium salts of stearic or dimer acid may be incorporated into the polymer to increase its rate of crystallization.

As noted hereinbefore, the polymer of this invention is characterized by a melting point low enough to permit blending with finely divided propellant oxidizers as well as a low melt viscosity which permits mixing with oxidizer under low shear conditions. At the same time, the polymer exhibits useful mechanical properties such as tensile strength and elongation at break over a temperature range extending from $-40°$ C. to about 80° C.

The following examples illustrate the invention in which parts are by weight unless otherwise indicated.

The following ASTM methods are employed in determining the properties of polymers prepared in the examples which follow:

| | |
|---|---|
| Modulus at 100% elongation*, $M_{100}$ | D412 |
| Modulus at 300% elongation*, $M_{300}$ | D412 |
| Modulus at 500% elongation*, $M_{300}$ | D412 |
| Tensile at Break*, $T_B$ | D412 |
| Elongation at Break*, $E_B$ | D412 |
| Tear Resistance, Die C | D624 |
| Melt Index** | D1238 |

*Cross-head speed 50 cm/minute
**2160 g load, temperature 120° C., drying conditions: 2 hours at 80° C.

Inherent viscosity of the polymers in the following examples is measured at 30° C. at a concentration of 0.1 g/dl in m-cresol.

EXAMPLE 1

Copolyester 1A was prepared by placing the following materials in an agitated flask fitted for distillation:

| | |
|---|---|
| Poly(tetramethylene oxide) glycol; number average molecular weight about 1000 | 26.5 parts |
| 1,6-Hexanediol | 15.0 parts |
| 1,4-Butanediol | 5.0 parts |
| Dimethyl terephthalate | 28.6 parts |
| Trimellitic anhydride | 0.075 parts |
| N,N'-Hexamethylenebis(3,5-di-tert-butyl-4-hydroxy-hydrocinnamamide) | 0.15 parts |
| Tetrabutyl titanate | 0.15 parts |

A stainless steel stirrer with a paddle cut to conform with the internal radius of the flask was positioned about ⅛" from the bottom of the flask and agitation was started. The flask was placed in an oil bath at 160° C., agitated for five minutes and then the catalyst was added. Methanol distilled from the reaction mixture as the temperature was slowly raised to 250° C. over a period of one hour. When the temperature reached 250° C. over a period of one hour. When the temperature reached 250° C. the pressure was gradually reduced to 40 Pa within 20 minutes. The polymerization mass was agitated at 250° C./40 Pa for 45 minutes. The resulting viscous molten product was scraped from the flask in a nitrogen (water and oxygen free) atmosphere and allowed to cool. The inherent viscosity of the polymer was 0.98 dl/g and the melt index measured at 120° C. was 6.8 g/10 min. The polymer was dried in an air circulated oven at 80° C. and compression molded at about 120° C. to a 1.0 mm thick slab in a press.

The physical properties of Copolyester 1A were determined according to the ASTM methods specified above.

For comparison, the physical properties of a prior art polymer (identified as Polymer 1B) disclosed in ACS Adv. Chem. Ser. 176, 129 (1979) by J. R. Wolfe, Jr. are listed. The polymer had an inherent viscosity of 1.57 dl/g determined under the same conditions as specified above.

The physical properties of both polymers are shown in Table I.

TABLE I

| | Polymer 1A | Control Polymer 1B |
|---|---|---|
| Short chain ester units, wt. % | 50 | 50 |
| 6GT* content of short chain ester units, % | 74** | 100 |
| Melting point, °C.*** | 101 | 122 |
| Melt index at 120° C., g/10 min | 6.8 | no flow**** |
| $M_{100}$, MPa | 5.2 | 5.2 |
| $M_{300}$, MPa | 5.9 | — |
| $T_B$, MPa | 9.7 | 13.5 |
| $E_B$, % | 820 | 750 |
| Tear resistance, Die C, kN | 52.5 | — |

*hexamethylene terephthalate
**determined by gas chromatography after alcoholysis
***determined by Differential Scanning Calorimetry (maximum of endotherm)
****The melt index data shown were not part of the original disclosure but were determined by applicant. A temperature of 140° C. was needed for actual melt flow, no melt flow was observed at 120° C. or 130° C.

The data shows that Control Polymer IB is too high melting to be useful as an explosive binder. On the other hand Copolyester IA offers a combination of low melt processing temperature, low melt viscosity and good elastomeric properties which is essential for use as a binder for explosives. In spite of its low melting point Copolyester IA does not become tacky when stored at 80° C.

EXAMPLE 2

(A) The procedure for preparing Copolyester IA was substantially repeated with the following starting materials:

| | |
|---|---|
| Poly(ethylene oxide) glycol; number average molecular weight about 1000 | 26.5 parts |
| 1,6-Hexanediol | 20.0 parts |
| Dimethyl terephthalate | 24.3 parts |
| Dimethyl isophthalate | 4.3 parts |
| Trimellitic anhydride | 0.12 parts |
| 1,3,5-Trimethyl-2,4,6-tri-(3,5-di-tert-butyl-4-hydroxylbenzyl)benzene | 0.18 parts |
| Tetrabutyl titanate | 0.18 parts |

The resulting polymer (Copolyester 2) had a short chain ester unit content of 50 wt. % of which 85% were hexamethylene terephthalate units. The copolyester had an inherent viscosity of 0.92 dl/g and a melt index of 8.4 dl/g. Copolyester 2 exhibited a similar level of physical properties as shown for Copolyester IA in Example 1. Because of its high oxygen content Copolyester 2 is particularly suited as a binder for high energy propellants.

EXAMPLE 3

The following procedure for preparing copolyester 1A was substantially repeated with the following starting materials:

| | 3A | 3B |
|---|---|---|
| Poly(ethylene oxide) glycol, parts | 26.5[(1)] | 34.5[(2)] |
| 1,6-Hexanediol, parts | 15.0 | 9.43 |
| 1,4-Butanediol, parts | 6.0 | 5.9 |
| Dimethyl terephthalate, parts | 28.6 | 22.3 |
| Trimellitic anhydride, parts | 0.08 | 0.08 |
| N,N'-Hexamethylenebis(3,5-di-tert-butyl-4-hydroxy-hydrocinnamamide, parts | 0.18 | 0.18 |
| Tetrabutyl titanate, parts | 0.15 | 0.15 |

[(1)]number average molecular weight 1450
[(2)]number average molecular weight 3350

The physical properties of the resulting polymers (Copolyesters 3A&3B) are shown in Table II. Because of their high oxygen content, Copolyesters 3A or B are particularly suited as a binder for high energy explosives and propellants. The polymers do not become tacky at a temperature of 80° C.

TABLE II

| | 3A | 3B |
|---|---|---|
| Short chain ester units, wt. % | 52 | 41 |
| 6GT* content of short chain ester units, % | 73** | 61** |
| Melting point, °C.** | 105 | 115 |
| Melt index at 120° C., g/10 min. | 7.0 | 2.4 |
| $M_{100}$, MPa | 5.17 | 7.0 |
| $M_{300}$, MPa | 6.75 | 7.25 |
| $T_B$, MPa | 11.1 | 8.0 |
| $E_B$, % | 840 | 800 |

TABLE II-continued

| | 3A | 3B |
|---|---|---|
| Tear resistance, Die C, kN | 70.1 | 67.0 |

*hexamethylene terephthalate
**determined by gas chromatography after alcoholysis

EXAMPLE 4

The procedure for preparing Copolyester 1A was substantially repeated with the following starting materials.

| | |
|---|---|
| Poly(propylene oxide) diimide diacid[(1)] | 26.5 parts |
| Dimethyl terephthalate | 22.9 parts |
| Dimethyl isophthalate | 5.72 parts |
| 1,6-Hexanediol | 26.0 parts |
| Trimellitic anhydride | 0.08 parts |
| 1,3,5-Trimethyl-2,4,6-tri-(3,5-di-tertbutyl-4-hydroxybenzyl)benzene | 0.15 parts |
| Tetrabutyl titanate | 0.18 parts |

[(1)]Prepared by imidization of trimellitic anhydride with Jeffamine D2000, a poly(propylene oxide) diamine having an average molecular weight of 2000 sold by Texaco Chemical Company.

The physical properties of the resulting polymer (Copolyester 4) are shown in Table III. Copolyester 4 has a polymer stick temperature above 80° C.

TABLE III

| | |
|---|---|
| Short cahin ester units, wt % | 57 |
| 6GT* content of short chain ester units, % | 80.0 |
| Melting point, °C.** | 108 |
| Melt index at 120° C., g/10 min | 10.1 |
| $M_{100}$, MPa | 4.1 |
| $M_{300}$, MPa | 4.8 |
| $T_B$, MPa | 8.8 |
| $E_B$, % | 860 |
| Tear resistance, Die C, kN | 43.8 |

*hexamethylene terephthalate
**determined by Differential Scanning Calorimetry

EXAMPLE 5

The procedure for preparing Copolyester 1A was substantially repeated with the following starting materials:

| | |
|---|---|
| Poly(tetramethylene oxide) glycol; number average molecular weight about 1000 | 26.5 parts |
| 1,6-Hexanediol | 20.0 parts |
| Dimethyl terephthalate | 24.3 parts |
| Dimethyl adipate | 3.86 parts |
| Trimellitic anhydride | 0.12 parts |
| N,N'-Hexamethylenebis(3,5-di-tert-butyl-4-hydroxy-hydrocinnamamide) | 0.15 parts |
| Tetrabutyl titanate | 0.18 parts |

The resulting polymer (Copolymer 5) had the properties given in Table IV.

TABLE IV

| | |
|---|---|
| Short chain ester units, wt. % | 50 |
| 6GT* content of short chain ester units | 85 |
| Melting point, C** | 104 |
| Melting index at 120° C., g/10 min | 10.1 |
| $M_{100}$, MPa | 4.1 |
| $T_B$, MPa | 4.5 |
| $E_B$, % | 200 |

EXAMPLE 6

The procedure for preparing Copolyester 1A was substantially repeated with the following starting materials:

| | |
|---|---|
| Poly(tetramethylene oxide) glycol; number average molecular weight about 1400 | 34.45 parts |
| 1,6-Hexanediol | 7.94 parts |
| 1,4-Butanediol | 8.8 parts |
| Dimethyl terephthalate | 22.36 parts |
| Trimellitic anhydride | 0.07 parts |
| 1,3,5-Trimethyl-2,4,5-tri(3,5-di-tert-butyl-4-hydroxylbenzyl)benzene | 0.2 parts |
| Tetrabutyl titanate | 0.18 parts |

The resulting polymer (Copolyester 6) had a short chain ester unit content of 36 wt. % of which units. Physical properties of Copolyester 6 are shown in Table V.

TABLE V

| | |
|---|---|
| Melting point, °C. | 91 |
| Melt index at 120° C., g/10 min | 5.6 |
| $M_{100}$, MPa | 2.55 |
| $M_{300}$, MPa | 2.96 |
| $T_B$, MPa | 3.6 |
| $E_B$, % | 550 |
| Tear resistance, Die C, kN | 24.1 |

EXAMPLE 7

The procedure for preparing copolyester 1A substantially repeated with the following starting materials:

| | |
|---|---|
| Poly(tetramethylene oxide) glycol[(1)]; parts | 26.5 |
| 1,6-Hexanediol, parts | 15.0 |
| 1,4-Butenediol, parts | 5.6 |
| Dimethyl terephthalate, parts | 28.6 |
| N,N'-Hexamethylenebis(3,5-di-tert-butyl-4-hydroxy-hydrocinnamamide, parts | 0.18 |
| Tetrabutyl titanate, parts | 0.15 |

[(1)]Number average molecular weight 1000

The physical properties of the resulting polymer (Copolyester 7) are listed in Table VI.

TABLE VI

| | |
|---|---|
| Short chain ester units, wt. % | 49 |
| 6GT* content of short chain ester units, % | 84** |
| Melting point, °C.*** | 100 |
| Melt index at 120° C., g/10 min | 6.5 |
| $M_{100}$, MPa | 3.9 |
| $M_{300}$, MPa | 4.2 |
| $T_B$, MPa | 6.1 |
| $E_B$, % | 640 |

*hexamethylene terephthalate
**determined by Nuclear Magnetic Resonance
***determined by Differential Scanning Calorimetry (maximum of endotherm)

EXAMPLE 8

The procedure for preparing Copolyester 1A was substantially repeated with the following starting materials;

| | |
|---|---|
| Copolyether glycol*; number average molecular weight about 2150 | 30.5 parts |
| 1,6-Hexanediol | 10.0 parts |
| 1,4-Butanediol | 6.4 parts |
| Dimethyl terephthalate | 25.3 parts |
| Trimellitic anhydride | 0.07 parts |
| 1,3,5-Trimethyl-2,4,6-tri(3,5-di-tert-butyl-4-hydroxylbenzyl)benzene | 0.02 parts |
| Tetrabutyl titanate | 0.15 parts |

*Ethylene oxide/propylene oxide copolyether glycol end-capped with ethylene oxide. Total ethylene oxide content: 80 wt. %.

The resulting polymer (Copolyester 8) had a short chain ester unit content of 45 wt. % of which 58% consisted of 1,6-hexamethylene terephthalate units. Physical properties of Copolyester 8 are shown in Table VII.

TABLE VII

| | |
|---|---|
| Melting point, °C. | 107 |
| Melt index at 120° C.,g/10 min | 15.8 |
| $M_{100}$, MPa | 4.5 |
| $M_{300}$, MPa | 5.5 |
| $T_B$, MPa | 6.7 |
| $E_B$, % | 680 |
| Tear resistance, Die C, kN | 25.9 |

Because of its high oxygen content Copolyester 8 is particularly suited as a binder for high energy propellants. The polymer has excellent low temperature properties and does not become tacky at a temperature of 80° C.

I claim:

1. A polymer which is useful as a thermoplastic rubbery binder for oxidizer particles for the preparation of low vulnerability gun propellants is provided by a segmented thermoplastic copolyester elastomer consisting essentially of a multiplicity of recurring intralinear long chain and short chain ester units connected head-to-tail through ester linkages, said long chain ester units being represented by the following structure:

and said short chain ester units being represented by the following structure:

wherein:

G is a divalent radical remaining after removal of terminal hydroxyl groups from a poly(alkylene oxide) glycol having a carbon-to-oxygen ratio of about 2.0–4.3 and a molecular weight of about 600–6000;

R is a divalent radical remaining after removal of carboxyl groups from a dicarboxylic acid having a molecular weight less than about 300;

D is a divalent radical remaining after removal of hydroxyl groups from a linear diol having 2–8 carbon atoms and represented by the formula $HO(CH_2)_{2-8}OH$ or the diol $HO(CH_2CH=CHCH_2)OH$;

with the proviso that the short chain ester units constitute about 30–65% by weight of the copolyester, at least about 50% of the R groups are 1,4-phenlene radicals, at least about 50% of the D groups are 1,6-hexamethylene radicals, and the sum of the percentages of the R groups which are not 1,4-phenylene radicals and of the D groups which are not 1,6-hexamethylene radicals is about 5-50%.

2. A segmented thermoplastic copolyester elastomer of claim 1 having a melt index of about 2-25 g/10 minutes at 120° C.

3. A segmented thermoplastic copolyester of claim 2 wherein the melt index is about 4-15 g/10 minutes at 120° C.

4. A segmented thermoplastic copolyester elastomer of claim 1 or 4 wherein the short chain ester units (b) are derived from terephthalic acid and isophthalic acid or their ester forming equivalents and 1,6-hexanediol.

5. A segmented thermoplastic copolyester elastomer of claim 1 wherein the short chain ester units (b) are derived from terephthalic acid or its ester forming equivalents and a mixture of 1,6-hexanediol and 1,4-butanediol.

6. A segmented thermoplastic copolyester elastomer of claim 1 wherein the long chain ester units (a) are derived from poly(ethylene oxide) glycol or poly(propylene oxide) glycol.

7. A segmented thermoplastic copolyester elastomer of claim 1 wherein the long chain ester units (a) are derived from ethylene oxide/propylene oxide copolyester glycol end-capped with ethylene oxide.

8. A segmented thermoplastic copolyester elastomer of claim 1 wherein the long chain ester units (a) are derived from poly(tetramethylene oxide) glycol.

* * * * *

UNITED STATES PATENT OFFICE
CERTIFICATE OF CORRECTION

PATENT NO. : 4,973,658
DATED : November 27, 1990
INVENTOR(S) : Guenther K. Hoeschele It is certified that error appears in the above-identified patent and that said Letters Patent is hereby corrected as shown below:

<u>Claim 4.</u>

Column 13, line 15, delete "or 4".

Signed and Sealed this

Tenth Day of November, 1992

Attest:

DOUGLAS B. COMER

*Attesting Officer*   *Acting Commissioner of Patents and Trademarks*